(12) United States Patent
Kudo et al.

(10) Patent No.: US 11,026,262 B2
(45) Date of Patent: Jun. 1, 2021

(54) WIRELESS COMMUNICATION SYSTEM AND WIRELESS COMMUNICATION METHOD

(71) Applicant: NIPPON TELEGRAPH AND TELEPHONE CORPORATION, Tokyo (JP)

(72) Inventors: Riichi Kudo, Yokosuka (JP); Hirantha Sithira Abeysekera, Yokosuka (JP); Munehiro Matsui, Yokosuka (JP); Shoko Shinohara, Yokosuka (JP); Yasushi Takatori, Yokosuka (JP); Takeo Ichikawa, Yokosuka (JP); Masato Mizoguchi, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/747,612

(22) PCT Filed: Aug. 15, 2016

(86) PCT No.: PCT/JP2016/073837
§ 371 (c)(1),
(2) Date: Jan. 25, 2018

(87) PCT Pub. No.: WO2017/033788
PCT Pub. Date: Mar. 2, 2017

(65) Prior Publication Data
US 2018/0249507 A1 Aug. 30, 2018

(30) Foreign Application Priority Data
Aug. 21, 2015 (JP) .............................. JP2015-164099

(51) Int. Cl.
*H04W 74/08* (2009.01)
*H04W 72/14* (2009.01)
(Continued)

(52) U.S. Cl.
CPC ....... *H04W 74/0833* (2013.01); *H04W 72/08* (2013.01); *H04W 72/14* (2013.01);
(Continued)

(58) Field of Classification Search
CPC ............. H04W 74/0833; H04W 74/04; H04W 74/0816; H04W 72/04; H04W 72/08; H04W 72/14; H04W 72/12; H04W 84/12
(Continued)

(56) References Cited

U.S. PATENT DOCUMENTS 7,856,241 B2 * 12/2010 Ishii ...................... H04W 74/06
370/395.3
2005/0054359 A1 3/2005 Ishii et al.
(Continued)

FOREIGN PATENT DOCUMENTS

CN 101300788 A 11/2008
JP 2013034070 A 2/2013
(Continued)

OTHER PUBLICATIONS

"Part 11: Wireless LAN Medium Access Control (MAC) and Physical Layer (PHY) Specifications", IEEE P802.11-REVmcTM/D3.0, Jun. 2014 (Year: 2014).*
(Continued)

*Primary Examiner* — Yemane Mesfin
*Assistant Examiner* — Intekhaab A Siddiquee
(74) *Attorney, Agent, or Firm* — Harness, Dickey & Pierce, P.L.C.

(57) ABSTRACT

Provided is a wireless communication system in which, based on a random access scheme, a transmission opportu-
(Continued)

nity (TXOP) acquired by a wireless access point is granted to a wireless station when performing uplink data transmission from the wireless station to the wireless access point and the TXOP acquired by the wireless station is granted to the wireless access point when performing downlink data transmission from the wireless access point to the wireless station, the system includes a scheduling unit for TXOP granting determining one or more wireless stations having a quality of an uplink data transmission lower than a prescribed value as TXOP responders to which the wireless access point grants the TXOP, and determining one or more wireless stations having a quality of a downlink data transmission lower than the prescribed value as TXOP holders which grant the TXOP to the wireless access point.

8 Claims, 7 Drawing Sheets

(51) Int. Cl.
  *H04W 72/08* (2009.01)
  *H04W 84/12* (2009.01)
  *H04W 74/04* (2009.01)
  *H04W 72/12* (2009.01)
(52) U.S. Cl.
  CPC .... *H04W 74/0816* (2013.01); *H04W 72/1231* (2013.01); *H04W 74/04* (2013.01); *H04W 84/12* (2013.01)
(58) Field of Classification Search
  USPC .......................................................... 370/329
  See application file for complete search history.

(56) References Cited

U.S. PATENT DOCUMENTS

| 2005/0063341 | A1* | 3/2005 | Ishii ...................... H04W 74/06 370/332 |
| 2005/0135307 | A1 | 6/2005 | Yang et al. |
| 2007/0058605 | A1 | 3/2007 | Meylan et al. |
| 2010/0135236 | A1 | 6/2010 | Wang et al. |
| 2014/0086227 | A1 | 3/2014 | Yang et al. |
| 2016/0353485 | A1* | 12/2016 | Wentink ................ H04W 74/04 |
| 2017/0215083 | A1 | 7/2017 | Kudo et al. |

FOREIGN PATENT DOCUMENTS

| KR | 102005006426 A | 6/2005 |
| WO | WO-2016027855 A1 | 2/2016 |

OTHER PUBLICATIONS

International Preliminary Report on Patentability for PCT/JP2016/073837 (Ch. I) IB/Geneva, with English Translation, dated Feb. 27, 2018, incorporating the English Translation of the Written Opinion of the ISA, dated Oct. 25, 2016, ISA/JP.
Office Action in Japanese Patent Application No. JP 2017-536757, "Notification of Reasons for Refusal", JPO, dated Nov. 8, 2018, with English translation attached.
Part 11: Wireless LAN Medium Access Control (MAC) and Physicial Layer (PHY) Specifications, IEEE Std 802.11acTM-2013, New York.
On the primacy of licensed spectrum in relation to the proposal of using LTE for a licensed-assisted access to unlicensed spectrum, RP-140057, 3GPP TSG-RAN #63, 2014.
Kudo, Riichi et al., "Channel Access Acquisition Mechanism Coupled With Cellular Network for Unlicensed Spectrum", IEEE 81st Vehicular Technology Conference, May 2015.
MediaTek Inc., "LBT design for Licensed Assisted Access", 3GPP TSG RAN WG1 meeting #82, Aug. 2015.
International Search Report regarding PCT/JP2016/073837, dated Oct. 25, 2016.
Korean Office regarding KRSN 1020187003967, dated Feb. 27, 2019.
Extended European Search Report regarding EPSN 168391357, dated Feb. 14, 2019.
European Office Action regarding EP168391357, dated Oct. 8, 2019.

* cited by examiner (a) Uplink data transmission, AP is TXOP holder (b) Downlink data transmission, STA is TXOP holder TXOP: transmission opportunity (a) AP has downlink data (b) AP does not have downlink data (a) Uplink data transmission (b) Downlink data transmission

WIRELESS COMMUNICATION SYSTEM AND WIRELESS COMMUNICATION METHOD

CROSS REFERENCE TO RELATED APPLICATION

This application is a U.S. National Stage application claiming the benefit of prior filed International Application Number PCT/JP2016/073837, filed on Aug. 15, 2016, in which the International Application claims priority from Japanese Patent Application Number 2015-164099, filed on Aug. 21, 2015, the entire contents of which are incorporated herein by reference.

TECHNICAL FIELD

The present invention relates to granting of a transmission opportunity (TXOP) when performing downlink data transmission from a wireless access point (AP) to a wireless station (STA) or granting of the TXOP when performing uplink data transmission from the STA to the AP, in a wireless communication system and a wireless communication method in which communication is performed based on a random access scheme such as Carrier Sense Multiple Access/Collision Avoidance (CSMA/CA).

Particularly, the present invention relates to processing that selects a TXOP holder that is a STA which grants a TXOP to an AP in order to perform downlink data transmission. Furthermore, the present invention relates to processing that selects a TXOP responder that is a STA to which an AP grants a TXOP, in order to perform uplink data transmission.

BACKGROUND ART

Wireless Local Area Network (LAN) systems in a standard IEEE 802.11 have been improved in throughput year after year, and have come into widespread use as one example of main wireless access (Non-Patent Document 1). Because the wireless LAN system can be used in an unlicensed band that is a frequency band which does not require a license, various types of wireless stations have come into widespread use. Particularly, the spread of smartphones remarkably increases an opportunity to use the wireless LAN system.

A 2.4 GHz band, a 5 GHz band, and a 60 GHz band are assigned as unlicensed bands that are frequency bands which are used by the wireless LAN system. In microbands, a 2.4 GHz band and a 5 GHz band, a band that can be used by the wireless LAN system in Japan is approximately 500 MHz. Furthermore, a band that is equal to or greater than 500 MHz is assigned as a band that is possibly used abroad by the wireless LAN system. On the other hand, because wireless communication in an unlicensed band is performed based on a random access scheme such as CSMA/CA, a hidden terminal problem is a great obstacle. Flow control that uses request-to-send (RTS) and clear-to-send (CTS) is proposed for the purpose of solving the hidden terminal problem.

At this point, as illustrated in FIG. 8, two wireless LANs, a basic service set (BSS) a and a BSS b, are present in a communication area where an AP 10 and a STA 20-1 to a STA 20-3 communicate with each other, using an unlicensed band. The AP 10 and the STA 20-1 are present in positions where wireless signals of an AP a and a STA a on one wireless LAN, the BSS a, can be detected. The STA 20-1 and the STA 20-2 are present in positions where wireless signals of an AP b and a STA b on the other wireless LAN, the BSS b, can be detected. The STA 20-3 is present in a position where communication between the BSS a and the BSS b cannot be detected.

First, in the uplink data transmission (transmission from the STA to the AP) that is illustrated in (a) of FIG. 8, a case where the STA 20-1 acquires a TXOP and transmits a data frame does not pose any problem. However, when the STA 20-3 is set to acquire the TXOP and transmit the data frame, a collision occurs in the AP 10 due to communication over the BSS a that is a hidden terminal from the standpoint of the STA 20-3, or a failure in the uplink data transmission occurs because of a Network Allocation Vector that is set for the AP 10. In this case, the AP 10 acquires the TXOP, and grants the acquired TXOP to the STA 20-3. Thus, an influence of a hidden terminal that is viewed from the STA 20-3 is reduced and throughput of the uplink from the STA 20-3 to the AP 10 can be improved (Non-Patent Document 3).

Next, the downlink data transmission (transmission from the AP to the STA) in (b) of FIG. 8 will be considered. In communication that is based on the RTS/CTS, before the AP 10 transmits user data to the STA 20-1, an RTC frame is transmitted when a wireless signal over a wireless channel, which is transmitted by the AP 10, cannot be detected, the STA 20-1 transmits a CTS frame according to the RTS frame, and the AP a and the STA a on the BSS a set the network allocation vector (NAV) according to the RTS frame or the CTS frame. Furthermore, the AP b and the STA b on the BSS b set the NAV according to the CTS frame that is transmitted by the STA 20-1. Accordingly, the BSS a stops the communication, and along with this, the BSS b that is a hidden terminal from the standpoint of the AP 10 can stop the communication, and can perform transmission to the STA 20-1 over a wireless channel over which the AP 10 acquires the TXOP.

In this manner, when it comes to exchange of the RTS frame and the CTS frame, even if the wireless signal over the BSS b, which cannot be detected from the AP in the STA, is present, the STA sets the NAV using the CTS frame, according to the RTS frame from the AP. Thus, it is possible that the hidden terminal problem is solved and that a decrease in throughput is prevented.

Incidentally, in 3GPP, a standardization organization, the discussion on a cellular system that uses an unlicensed band for a wireless LAN has begun (Non-Patent Document 2) as well, and attention has been focused on a method of utilizing the unlicensed band. That is, in the cellular system, the utilization of a frequency band (the unlicensed band) for the wireless LAN in compliance with specifications for the unlicensed band has been discussed as well. The description as the wireless LAN is provided here, but any communication system in which communication is performed with the random access in the unlicensed band may be available.

For example, in a situation that is illustrated in (b) of FIG. 8, when a data frame from the AP 10 to the STA 20-1 is transmitted, an environment where wireless resources are insufficient for the wireless signal of the terminal in the BSS b that is the hidden terminal from the AP 10 (an environment where the wireless signal is always transmitted) is considered. In this case, a frame that is transmitted from the AP 10 experiences a collision, and thus is not received in the STA 20-1, or due to the NAV that is set by the BSS b, the STA-20 cannot transmit the CTS frame in response to the RTS frame that is transmitted from the AP 10. As a result, a problem occurs in that although control which is based on the RTS and CTS is performed, throughput decreases. To cope with this problem, the STA 20-1 sets the NAV or a transmission prohibition section that has the same function as the NAV, for the BSS b that is the hidden terminal from the AP 10 and thus acquires the TXOP. Then, the STA 20-1 grants the acquired TXOP to the AP 10, and transmits the data frame using the TXOP that is granted by the AP 10. Thus, an influence of the hidden terminal in the AP 10 is reduced and throughput of downlink from the AP 10 to the STA 20-1 can be improved (Non-Patent Document 3).

Non-Patent Document 1: IEEE Std 802.11ac(TM)-2013, IEEE Standard for Information technology—Telecommunications and information exchange between systems Local and metropolitan area networks—Specific requirements, Part 11: Wireless LAN Medium Access Control (MAC) and Physical Layer (PHY) Specifications, December 2013

Non-Patent Document 2: RP-140057, "On the primacy of licensed spectrum in relation to the proposal of using LTE for a licensed-assisted access to unlicensed spectrum", 3GPP TSG-RAN #63, March 2014

Non-Patent Document 3: R. Kudo, B. A. H. S. Abeysekera, Y. Takatori, T. Ichikawa, M. Mizoguchi, H. Yasuda, A. Yamada, Y. Okumura, "Channel access acquisition mechanism coupled with cellular network for unlicensed spectrum", in Proc., VTC2015-Spring, May 2015

DISCLOSURE

Problems to be Solved

However, there is a problem in that the unfairness in throughput between the STAs is caused to occur depending on how to make a selection, that is, how to select the STA to which the AP grants the TXOP in order to perform the uplink data transmission, or how to select the STA that grants the TXOP to the AP in order to perform the downlink data transmission. For example, although like the STA 20-3 that is illustrated in (a) of FIG. 8, the STA itself acquires the TXOP in order to perform the transmission, if throughput of the uplink data transmission decreases remarkably due to the communication over the BSS a that is in a hidden-terminal relation, it is effective to grant the TXOP that is acquired by the AP 10 to the STA 20-3. On the other hand, as is the case with the STA 20-2 that is in a position of the hidden terminal from the BSS a, although the TXOP that is acquired by the AP 10 is uniformly granted to an arbitrary STA, this does not necessarily contribute to an improvement in throughput.

Furthermore, if the TXOP that is to be granted to the AP 10 in order to perform the downlink data transmission is set to be acquired by all STAs, the number of nodes that participate in random access on the downlink increases dramatically and system throughput of the downlink is greatly improved. However, a problem occurs as well in that one STA occupies many wireless resources in contrast to the BSS in the vicinity and the unfairness between the BSSs is caused to occur. In this case, if the number of STAs that are set to acquire the TXOP is configured to be as small as possible, an influence that is exerted to the communication over the BSS in the vicinity can be decreased, but there is a need to suitably select the STA in which the throughput is greatly improved by granting the TXOP to the AP 10.

A preposition of the present invention is to provide a wireless communication system and a wireless communication method that are capable of efficiently performing selection of an STA to which an AP grants a TXOP in order to perform uplink data transmission and selection of the STA that grants the TXOP to the AP in order to perform downlink data transmission in the wireless communication system that is based on random access.

Means for Solving the Problems

According to a first invention, there is provided a wireless communication system in which, based on a random access scheme, a TXOP acquired by a wireless access point is granted to a wireless station when performing uplink data transmission from the wireless station to the wireless access point and the TXOP acquired by the wireless station is granted to the wireless access point when performing downlink data transmission from the wireless access point to the wireless station, the system including a scheduling unit for TXOP granting determining one or more wireless stations having a quality of the uplink data transmission lower than a prescribed value as TXOP responders to which the wireless access point grants the TXOP, and determining one or more wireless stations having a quality of the downlink data transmission lower than the prescribed value as TXOP holders which grant the TXOP to the wireless access point.

In the wireless communication system according to the first invention, the scheduling unit for TXOP granting may be configured to determine one or more of the TXOP responders having the communication quality of the uplink which is indicated by a parameter, which indicates the quality of the uplink data transmission, lower than the prescribed value, and to transmit a notification signal representing information on the determination to the wireless access point; the wireless access point may include a unit transmitting a TXOP granting signal indicating a timing to perform the uplink data transmission to the TXOP responders after acquiring the information on the determination of the TXOP responders by the notification signal and acquiring the TXOP using the random access scheme; and the wireless station may include a unit transmitting a data frame on the uplink at the indicated timing when received the TXOP granting signal.

In the wireless communication system according to the first invention, the scheduling unit for TXOP granting may be configured to use, as the parameter indicating the quality of the uplink data transmission, at least one of a value indicating degradation in the quality of the uplink data transmission in contrast to the quality of the downlink data transmission, a frame error rate of the uplink, a TXOP acquisition rate of the uplink, a ratio of throughput to a QoS condition or a traffic volume demand in the uplink, and a frame retransmission rate of the uplink.

In the wireless communication system according to the first invention, the scheduling unit for TXOP granting may be configured to collect uplink traffic information relating to a traffic volume or a transmission-awaiting packet generated by the wireless station, and determine as the TXOP responders when the quality of the uplink data transmission lower than the prescribed value and a demand for uplink traffic in the wireless station is higher than the prescribed value.

In the wireless communication system according to the first invention, the scheduling unit for TXOP granting may be configured to determine one or more of the TXOP holders having the communication quality of the downlink which is indicated by a parameter, which indicates the quality of the downlink data transmission, lower than the prescribed value, and to transmit a notification signal representing information on the determination to the wireless station; the wireless station may include a unit transmitting a TXOP granting signal indicating a timing to perform the downlink data transmission to the wireless access point after recognizing as the TXOP holders by the notification signal and acquiring the TXOP using the random access scheme; and the wireless access point may include a unit transmitting a data frame on the downlink at the indicated timing when received the TXOP granting signal.

In the wireless communication system according to the first invention, the scheduling unit for TXOP granting may be configured to use, as the parameter indicating the quality of the downlink data transmission, at least one of a value indicating degradation in the quality of the downlink data transmission in contrast to the quality of uplink data transmission, a frame error rate of the downlink, a ratio of throughput to a QoS condition or a traffic volume demand in the downlink, and a frame retransmission rate of the downlink.

In the wireless communication system according to the first invention, the scheduling unit for TXOP granting may be configured to collect downlink traffic information relating to a traffic volume or a transmission-awaiting packet from the wireless access point to the wireless station, and to determine as the TXOP responders when the quality of the downlink data transmission is lower than the prescribed value and a demand for downlink traffic in the wireless access point is higher than the prescribed value.

According to a second embodiment, there is provided a wireless communication method in which, based on a random access scheme, a TXOP acquired by a wireless access point is granted to a wireless station when performing uplink data transmission from the wireless station to the wireless access point, the method including a step causing a scheduling unit for TXOP granting, which monitors a quality of the uplink data transmission, to determine one or more wireless stations having a parameter, which indicates the quality of the uplink data transmission, lower than a prescribed value as TXOP responders to which the wireless access point grants the TXOP, and to transmit a notification signal representing information on the determination to the wireless access point; a step causing the wireless access point to transmit a TXOP granting signal indicating a timing to perform the uplink data transmission to the TXOP responders after causing to acquire the information on the determination of the TXOP responders by the notification signal and to acquire the TXOP using the random access scheme; and a step of causing the wireless station to transmit a data frame on the uplink at the indicated timing when received the TXOP granting signal.

According to a third invention, there is provided a wireless communication method in which, based on a random access scheme, a TXOP acquired by a wireless station is granted to a wireless access point when performing downlink data transmission from the wireless access point to the wireless station, the method including a step causing a scheduling unit for TXOP granting, which monitors a quality of the downlink data transmission, to determine one or more wireless stations having a parameter, which indicates the quality of the downlink data transmission, lower than a prescribed value as TXOP holders which grant the TXOP to the wireless access point, and to transmit a notification signal representing information on the determination to the wireless station; a step causing the wireless station to transmit a TXOP granting signal indicating a timing to perform the downlink data transmission to the wireless access point after causing to recognize as the TXOP holders by the notification signal and to acquire the TXOP using the random access scheme; and a step causing the wireless access point to transmit a data frame on the downlink at the indicated timing when received the TXOP granting signal.

Effects

According to the present invention, a wireless station in which user experience decreases because low quality of uplink data transmission can be selected as a TXOP responder, based on statistical information or an empirical assumption, and a TXOP that is acquired by an AP can be preferentially granted to the TXOP. Thus, throughput in the uplink data transmission can be ensured in terms of fairness and can be improved.

According to the present invention, the wireless station in which the user experience decreases because low quality of downlink data transmission can be selected as a TXOP holder, based on the statistical information or the empirical assumption, and a STA grants the TXOP to the AP. Thus, throughput in the downlink data transmission can be ensured in terms of fairness and can be improved.

DETAILED DESCRIPTION OF THE EMBODIMENTS

Figure 1:
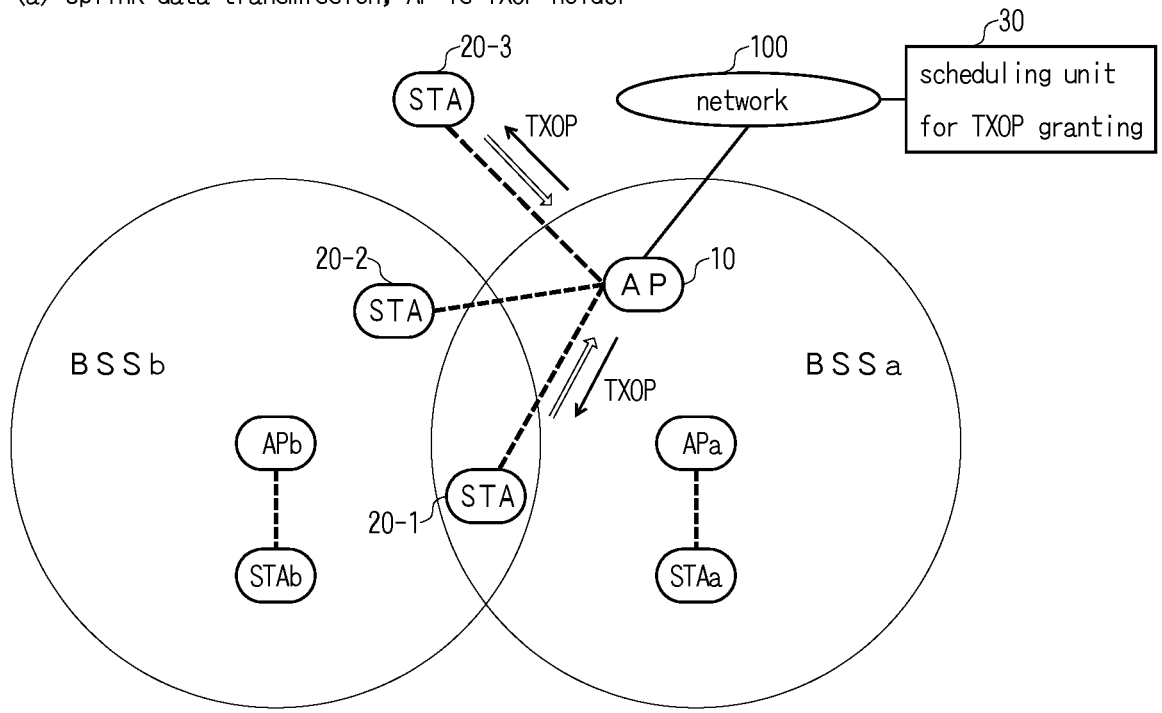
FIG. 1 is a diagram illustrating an example of a configuration of a wireless communication system.
Figure 1:
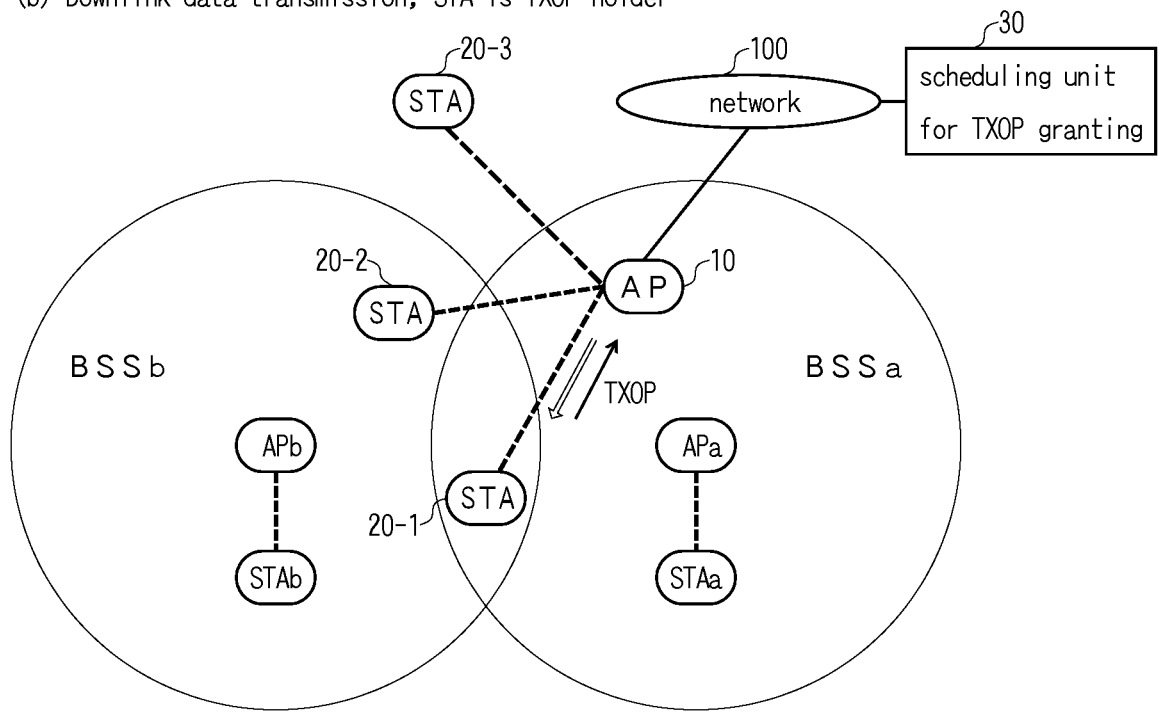

FIG. 1 illustrates an example of a configuration of a wireless communication system according to the present invention. (a) of FIG. 1 illustrates uplink data transmission that results from an AP granting a TXOP, and (b) of FIG. 1 illustrates downlink data transmission that results from a STA granting the TXOP.

Figure 8:
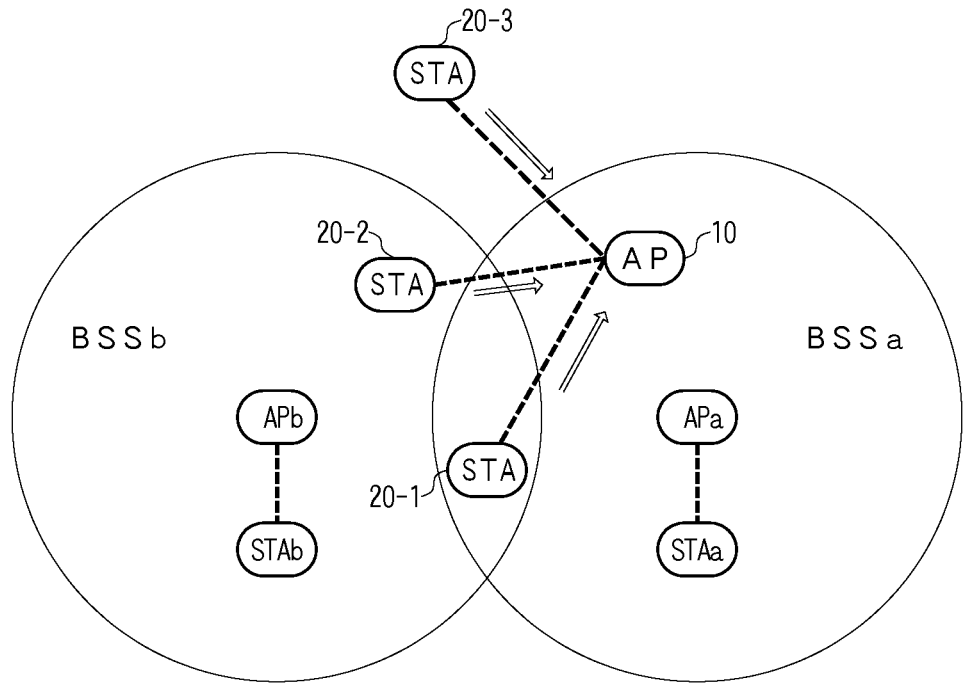
FIG. 8 is a diagram illustrating an example of a configuration of a wireless communication system in the related art.
Figure 8:
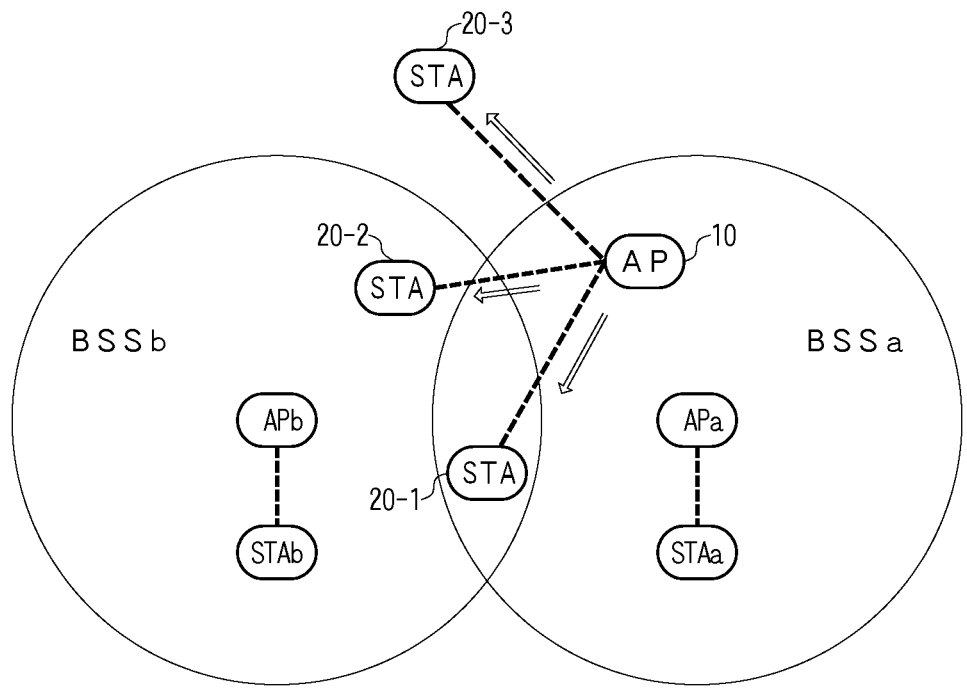

In (a) and (b) of FIG. 1, an AP 10 and a STA 20-1 to a STA 20-3 communicate with each other, and two wireless LANs, a BSS a and a BSS b are present in the vicinity of the AP 10 and the STA 20-1 to STA 20-3. The AP 10 and the STA 20-1 are present in positions where wireless signals of an AP a and a STA a on one wireless LAN, the BSS a, can be detected. The STA 20-1 and the STA 20-2 are present in positions where wireless signals of an AP b and a STA b on the other wireless LAN, the BSS b, can be detected. The STA 20-3 is present in a position where communication between the BSS a and the BSS b cannot be detected. A basic configuration is the same as illustrated in FIG. 8, and the AP 10 is connected to a network 100.

The AP 10 has a function of granting the acquired TXOP to one or more STAs and thus causing the one or more STAs to perform the uplink data transmission (uplink TXOP granting). Furthermore, the STA 20 has a function of granting the acquired TXOP to an AP and thus causing the AP to perform the downlink data transmission (downlink TXOP granting).

The present invention has a feature of including a scheduling unit 30 for TXOP granting that performs processing which selects a STA to which the AP 10 grants the TXOP for the uplink data transmission from the STA 20-1 to the STA 20-3 to the AP 10 and processing which selects a STA that grants the TXOP to the AP 10 from the downlink data transmission from the AP 10 to the STA 20-1 to the STA 20-3. The scheduling unit 30 for TXOP granting may be included within the AP 10 and may be included on the network 100 to which the AP 10 makes a connection.

Figure 2:
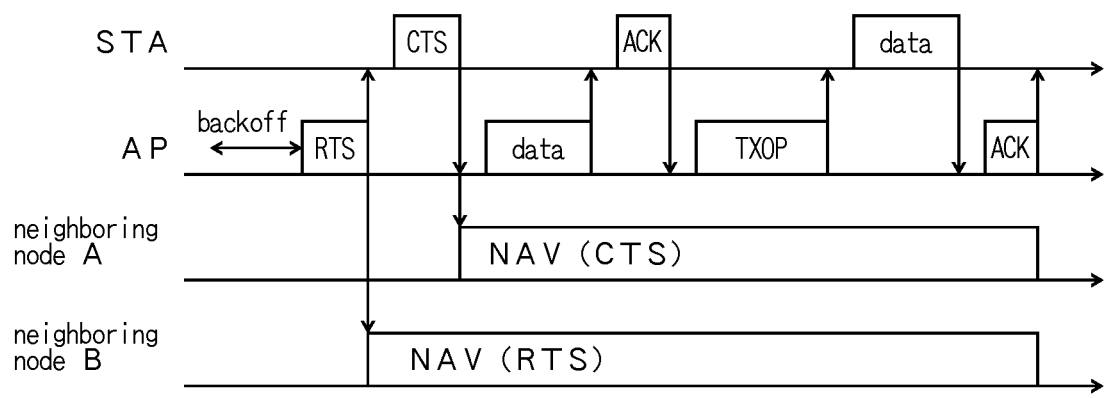
FIG. 2 is a diagram illustrating an example of uplink data transmission that results from an AP granting a TXOP.
Figure 2:
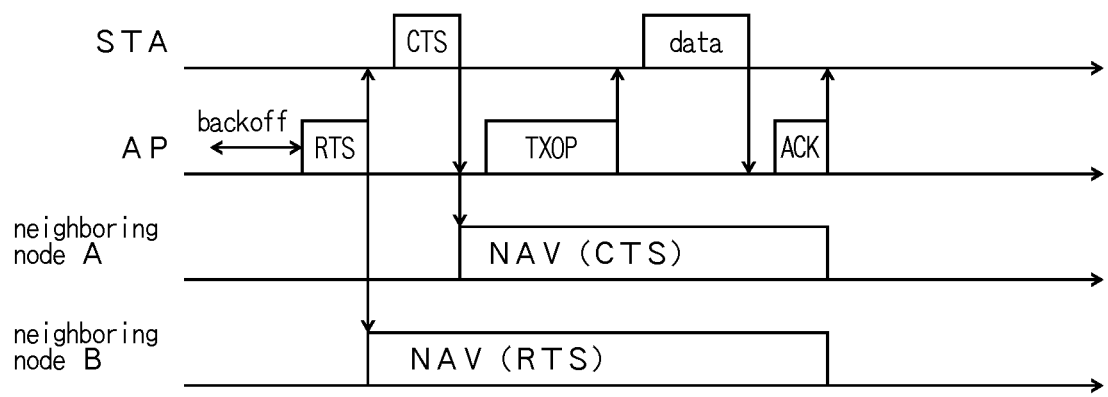

FIG. 2 illustrates an example of the uplink data transmission that results from the AP granting the TXOP. (a) of FIG. 2 illustrates a sequence for granting the TXOP acquired by the AP to the STA if the AP has downlink data. (b) of FIG. 2 illustrates a sequence for granting the TXOP acquired by the AP to the STA if the AP does not have the downlink data. It is noted that the same is true for a sequence for the downlink data transmission that results from the STA granting the TXOP, and that the AP and the STA may have a relation as opposed to that which is illustrated in FIG. 2.

Under the control of the scheduling unit 30 for TXOP granting, the AP grants the TXOP to a designated STA and the designated STA is caused to perform the uplink data transmission. The AP transmits an RTC frame after acquiring the TXOP, and receives a CTS frame that is transmitted from the corresponding STA. As illustrated in (a) of FIG. 2, if the AP has downlink data, the AP transmits TXOP granting signal to the STA after transmitting the data to the STA. Furthermore, as illustrated in (b) of FIG. 2, if the AP does not have the downlink data, the TXOP granting signal is transmitted to the STA after the CTS is received. With the reception of the TXOP granting signal, the STA transmits uplink data based on the TXOP that is granted by the AP. At this point, with the RTS that is transmitted by the AP or the CTS that is transmitted by the STA, along with the time at which the uplink data transmission that results from granting TXOP is performed, an NAV is set for neighboring nodes A and B.

An important point here is a function of the scheduling unit 30 for TXOP granting that selects a STA to which the AP grants the TXOP with the uplink data transmission, or a STA that grants the TXOP to the AP with the downlink TXOP, considering throughput of each STA. A processing procedure for granting the TXOP for uplink and the TXOP for downlink will be described below along with examples of configurations of the AP 10 and the STA 20, and the scheduling unit 30 for TXOP granting.

Figure 3:
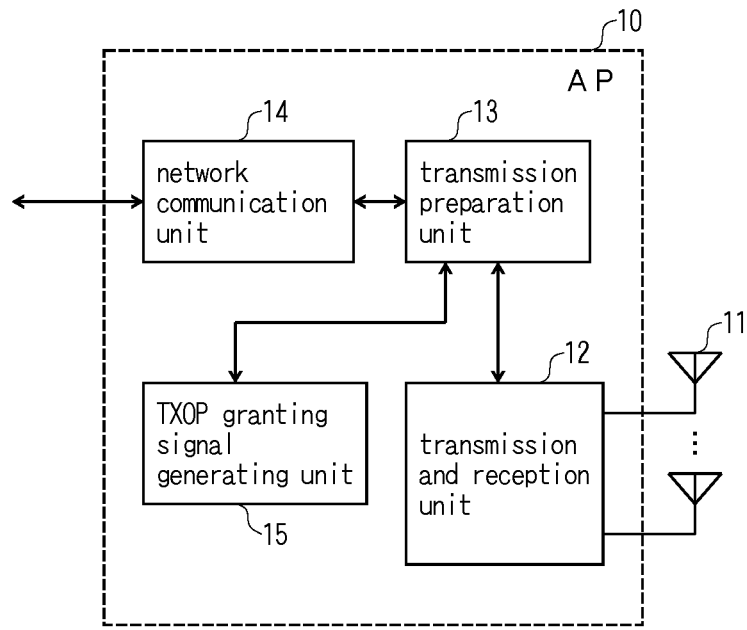
FIG. 3 is a diagram illustrating an example of a configuration of an AP 10.

FIG. 3 illustrates the example of the AP 10.

In FIG. 3, the AP 10 is configured with an antenna 11, a transmission and reception unit 12, a transmission preparation unit 13, a network communication unit 14, and a TXOP granting signal generating unit 15. When user data that is transmitted on the downlink from an external network through the network communication unit 14 is input, the AP 10 stores the received user data in a storage unit of the transmission preparation unit 13, and the transmission and reception unit 12 acquires the TXOP with random access control, performs RTS/CTS, and then builds a data frame for transmission through the antenna 11. At this point, the AP can have a function of performing transmission to a plurality of STAs using orthogonal frequency domain multiplexing access (OFDMA) or spatial multiplexing, and a plurality of STAs that are transmission targets may be available.

On the other hand, if the AP 10 grants the TXOP to the STA 20 in order to receive the user data on the uplink, the TXOP granting signal generating unit 15 performs its function. When acquiring a TXOP grant schedule from the scheduling unit 30 for TXOP granting that will be described above, the TXOP granting signal generating unit 15 notifies the transmission preparation unit 13 that the TXOP is granted to the STA which is designated with the TXOP grant schedule. If downlink data is present, the transmission preparation unit 13 acquires the TXOP, transmits the downlink data, and then transmits the TXOP granting signal from the transmission and reception unit 12 ((a) of FIG. 2), but, if the downlink data is not present, acquires the TXOP and then transmits the TXOP granting signal directly from the transmission and reception unit 12 ((b) of FIG. 2).

Figure 4:
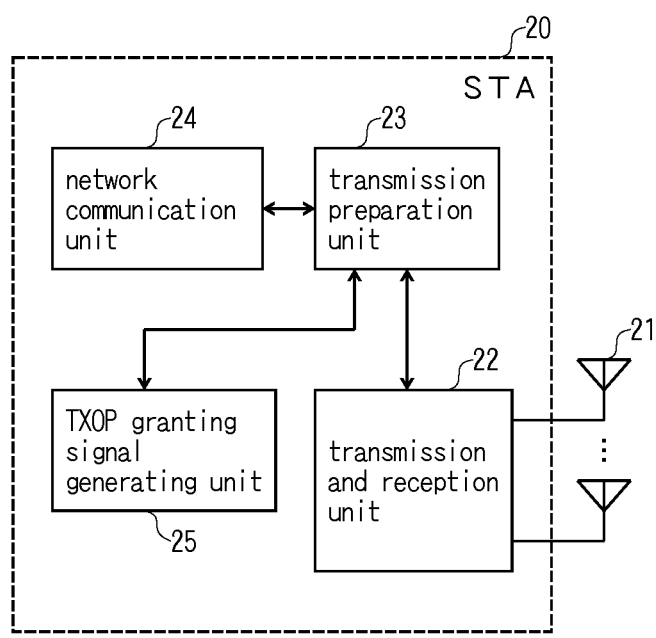
FIG. 4 is a diagram illustrating an example of a configuration of a STA 20.

FIG. 4 illustrates the example of the configuration of the STA 20.

In FIG. 4, the STA 20 is configured with an antenna 21, a transmission and reception unit 22, a transmission preparation unit 23, a network communication unit 24, and a TXOP granting signal generating unit 25. When the STA 20 stores user data from the network communication unit 24, which is transmitted on the uplink, in a storage unit of the transmission preparation unit 23, the transmission and reception unit 22 acquires the TXOP with the random access control, performs the RTS/CTS control, and then builds a data frame for transmission from the antenna 21. The network communication unit 24 possibly performs communication with a functional block within the STA, and can input and output a signal from and to other functional blocks within the STA, such as blocks for a portable communication network, wired communication, optical communication, and infrared communication.

Furthermore, if the STA 20 receives a signal on the downlink, the signal that is received in the antenna 21 is decoded in the transmission and reception unit 22, and the decoded code is output to the network communication unit 24 through the transmission preparation unit 23. If the TXOP granting signal that is transmitted from the AP 10 is included in the decoded signal, the uplink data that waits for transmission in the transmission preparation unit 23 is transmitted from the transmission and reception unit 22 on the uplink at a designated timing.

On the other hand, if the STA 20 grants the TXOP to the AP 10 in order to receive the signal on the downlink, the TXOP granting signal generating unit 25 performs its function. When acquiring the TXOP grant schedule from the scheduling unit 30 for TXOP granting, which will be described above, through the AP 10, the TXOP granting signal generating unit 25 notifies the transmission preparation unit 23 that the STA to which the TXOP granting signal generating unit 25 belongs acquires the TXOP with the TXOP grant schedule and grants the acquired TXOP to the AP 10. If uplink data is present, the transmission preparation unit 23 acquires the TXOP, transmits the uplink data, and then transmits the TXOP granting signal from the transmission and reception unit 22, but, if the uplink data is not present, acquires the TXOP and then transmits the TXOP granting signal directly from the transmission and reception unit 22.

Figure 5:
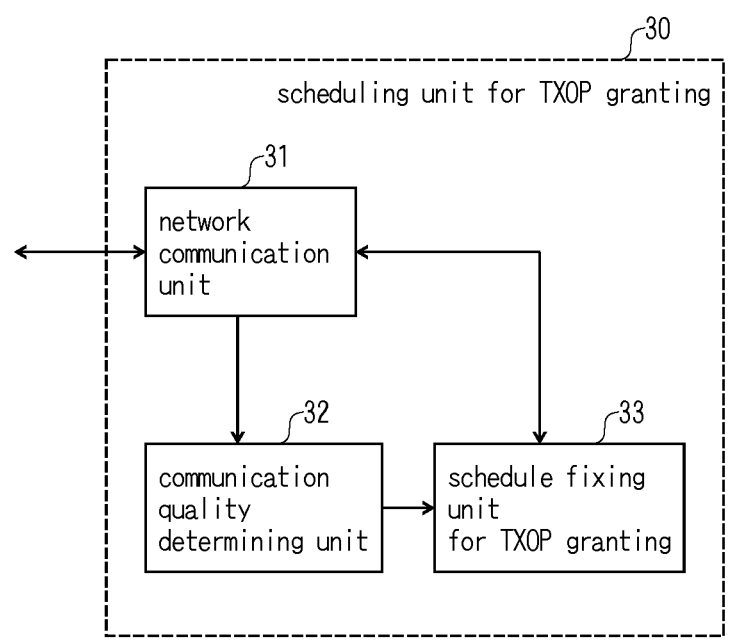
FIG. 5 is a diagram illustrating an example of a configuration of a scheduling unit 30 for TXOP granting.

FIG. 5 illustrates an example of the configuration of the scheduling unit 30 for TXOP granting.

In FIG. 5, the scheduling unit 30 for TXOP granting is configured with a network communication unit 31, a communication quality determining unit 32, and the schedule fixing unit 33 for TXOP granting. The communication quality determining unit 32 collects information relating to communication quality of the uplink or the downlink, or both. As the information to the communication quality, there is a frame error rate of the uplink/downlink or a TXOP acquisition rate of the uplink/downlink, a ratio of throughput to a quality of service (QoS) condition or a traffic volume demand in the uplink/downlink, or a frame retransmission of the uplink/downlink. Moreover, the communication quality determining unit 32 collects information on a function of the STA, contract information of an owner of the STA, positional information on the STA, information on traffic that occurs to the STA or on a packet awaiting transmission, and information on an application that is used by the STA, and can use these pieces of information for determining the TXOP grant schedule.

Based on communication quality information of the communication quality determining unit 32, the schedule fixing unit 33 for TXOP granting selects a STA to which the AP grants the TXOP or a STA that grants the TXOP to the AP, or a STA to which the TXOP is granted and which grants the TXOP, determines schedule information for TXOP granting that is set for each of the selected STA, and notifies the AP or the STA, or both of the determined schedule information through the network communication unit 31.

When the scheduling unit 30 for TXOP granting notifies the AP 10 of the schedule information for TXOP granting, a channel for a network that connects between the scheduling unit 30 for TXOP granting and the AP 10 can be used. When the scheduling unit 30 for TXOP granting notifies the STA 20 of the schedule information for TXOP granting, the scheduling unit 30 for TXOP granting may notify the STA 20 of whether to use the channel for the network that connects between the scheduling unit 30 for TXOP granting and the AP 10 or a wireless channel between the AP 10 and the STA 20, using a channel on which an external communication apparatus serves as an intermediary. However, if the scheduling unit 30 for TXOP granting is included in the AP 10, the schedule information for TXOP granting can be input and output directly within a circuit, without using the channel for the network between the scheduling unit 30 for TXOP granting and the AP 10.

(Uplink TXOP Granting)

Uplink TXOP granting will be described in detail below.

If the STA itself acquires the TXOP in the uplink, a probability that a signal of the neighboring BSS will be always detected and thus the TXOP will be able to be acquired is considerably low, a collision with a signal that is transmitted from a node which is a hidden terminal from the standpoint of the STA in the AP on the reception side is experienced and thus the communication is not successful, and so forth. Thus, the scheduling unit 30 for TXOP granting selects a STA that has communication quality of the uplink that results from the acquisition of the TXOP, which causes user experience to decrease, and sets the selected STA to be a "TXOP responder" to which the AP 10 grants the TXOP.

In an example in (a) of FIG. 1, when the STA 20-1 is set to acquire the TXOP on the uplink, a probability that the TXOP will be acquired by the communication over the BSS b decreases. Furthermore, when the STA 20-3 is set to acquire the TXOP on the uplink, the communication over the BSS a that is in a hidden-terminal relation cannot be detected, the collision with the signal occurs in the AP 10 and thus a probability that the communication will fail increases. The TXOP that is acquired by the AP 10 is preferentially granted to the STA 20-1 and the STA 20-3 as in such cases, and thus the user experience can be improved.

Figure 6:
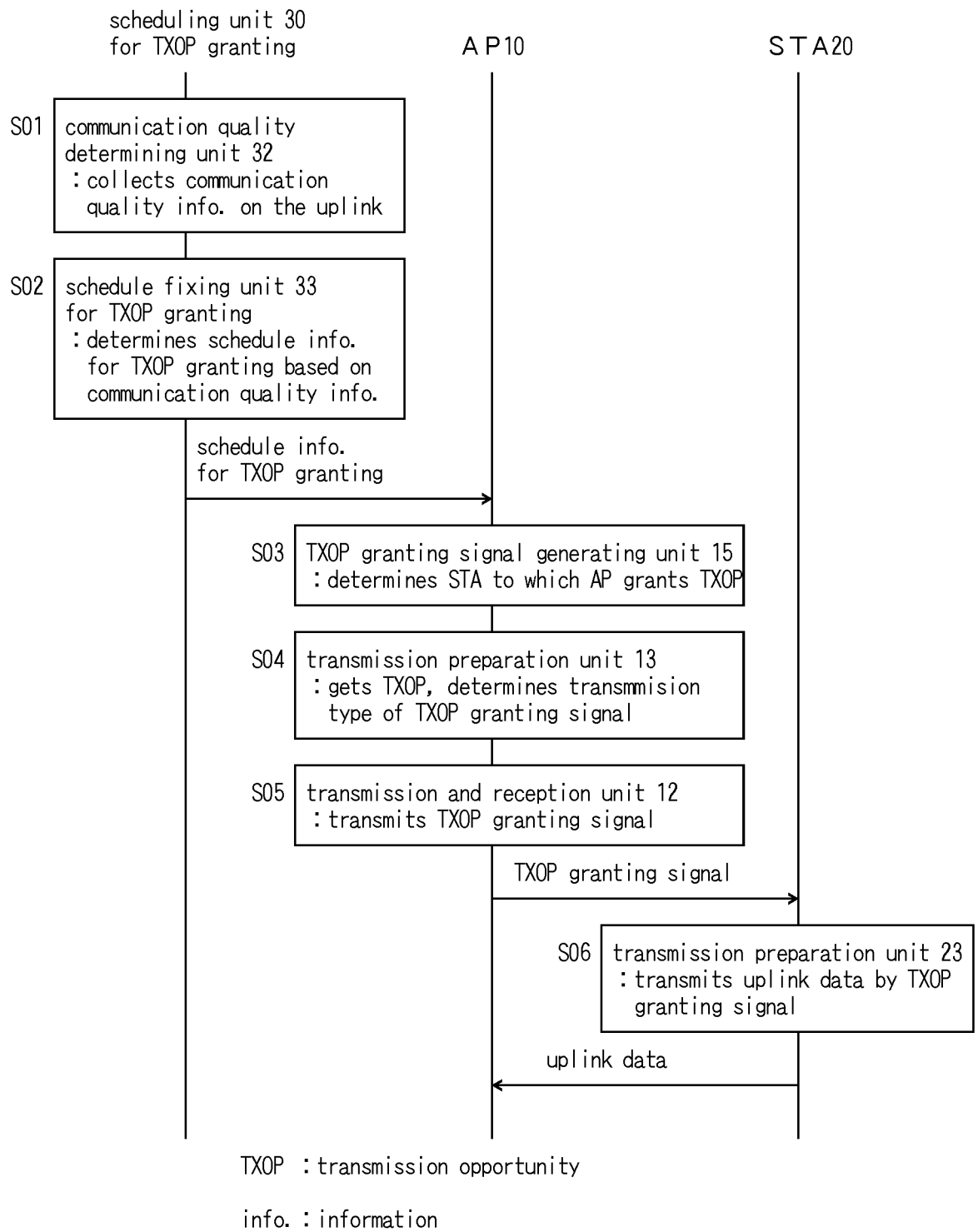
FIG. 6 is a diagram illustrating an example of a processing procedure for the uplink data transmission that results from the AP granting the TXOP.

FIG. 6 illustrates an example of a processing procedure for the uplink that results from the AP granting TXOP.

In FIG. 6, the communication quality determining unit 32 of the scheduling unit 30 for TXOP granting collects communication quality information on the uplink or the uplink/downlink (Step S01). Next, based on the collected communication quality information, the schedule fixing unit 33 for TXOP granting determines the schedule information for TXOP granting that is made up of information on one or more STAs to which the AP 10 grants the TXOP or information which includes prioritization of the one or more STAs, and notifies the AP 10 of the determined schedule information (Step S02). When the schedule information for TXOP granting is input, the TXOP granting signal generating unit 15 of the AP 10 determines a combination of one or more STAs to which the AP 10 grants the TXOP, and outputs the determined combination to the transmission preparation unit 13 (Step S03). The transmission preparation unit 13 determines a transmission type of the TXOP granting signal in accordance with the presence or absence of the downlink data, and notifies the transmission and reception unit 12 of the determined transmission type (Step S04). If downlink data is present, the transmission and reception unit 12 transmits the TXOP granting signal after transmitting the downlink data. If the downlink data is not present, the transmission and reception unit 12 transmits the TXOP granting signal after acquiring the TXOP (Step S05). The STA 20 that receives the TXOP granting signal transmits the user data on the uplink at a timing that is set by the TXOP granting signal (Step S06).

At this point, in the STA, if it is determined that throughput of the uplink data transmission which results from the acquisition of the TXOP causes the user experience to decrease, four selection methods of selecting the STA to which the AP grants the TXOP will be described.

(Method 1 of Selecting the TXOP Responder)

The scheduling unit 30 for TXOP granting collects information relating to transmission-awaiting user data from the STA that is an AP 10's partner in the uplink data transmission, request traffic information, and application information. Then, in each STA, the throughput of the uplink data transmission in the acquisition of the TXOP is compared against the condition, and the TXOP responder is preferentially selected from among STAs in which the throughput of the uplink data transmission is in the poorest condition. A transmission resource that is allocated by the OFDMA or the spatial multiplexing may be determined from a PHY rate between the AP 10 and the STA and bits of a shortest packet, and the TXOP may be granted to a plurality of STA's partners. On this occasion, the TXOP responder may be selected from among the STAs that transmit the user data on the downlink. Regardless of a transmission destination on the downlink, the TXOP responder may be selected.

With this control, the uplink data transmission can be prevented from causing the user experience to decrease due to low quality, and the TXOP that is acquired by the AP can be preferentially granted to the STA that has low quality of the uplink data transmission.

(Method 2 of Selecting the TXOP Responder)

The AP 10 measures the frame error rate of the uplink that results from the STA acquiring the TXOP, and based on a result of the measurement, the scheduling unit 30 for TXOP granting preferentially selects the STA that has a high frame error rate, as the TXOP responder. Accordingly, from the frame error rate of the uplink, it can be simply detected that the uplink is in a poor condition, and the TXOP that is acquired by the AP can be preferentially granted to the STA that has the low quality of the uplink data transmission.

(Method 3 of Selecting the TXOP Responder)

The scheduling unit 30 for TXOP granting evaluates the communication quality of the uplink and the downlink that results from the STA acquiring the TXOP, for example, the throughput or the frame error rate. As the communication quality of the uplink that results from the acquisition of the TXOP is poorer by comparison with the communication quality of the downlink that results from the acquisition of the TXOP, the scheduling unit 30 for TXOP granting more preferentially makes a selection as the TXOP responder.

With this control, the comparison of the quality of the uplink/downlink is performed, and thus it can be more precisely detected that a specific STA is in a condition where the TXOP is difficult to acquire due to a hidden terminal/exposed terminal problem, than in the selection method 2, and the TXOP that is acquired by the AP can be preferentially granted to the STA that has the low quality of the uplink data transmission.

(Method 4 of Selecting the TXOP Responder)

The scheduling unit 30 for TXOP granting collects pieces of information that have high correlation with the communication quality, such as positional information on the STA or average received signal strength information from the STA, and information on the time at which the communication is performed, and selects the TXOP responder based on machine learning or an empirical assumption, from information other than the communication quality and the performance of the TXOP granting so far. For example, throughput characteristics of the uplink and the downlink, which relates to location information on the STA, are stored in the communication quality determining unit 32 of the scheduling unit 30 for TXOP granting, and thus the STA that is assumed to have the low communication quality of the uplink or the downlink can be determined using the location information, or if the location information on the STA and time information satisfy a fixed condition, it can be determined that the communication quality of the uplink or the downlink is low. In addition, the communication quality may be determined from information other than direct communication, such as a function of, owner information on, and application use information on the STA, and the TXOP grant schedule may be determined.

With the methods of selecting the TXOP responder, which are described above, based on statistical information or the empirical assumption, the TXOP that is acquired by the AP can be preferentially granted to the STA that has the low quality of the uplink data transmission, and the user experience can be prevented from decreasing because of the low quality of the uplink data transmission.

Furthermore, based on the methods of selecting the TXOP responder, which are described above, weight to the STA or a ratio of resources on which the TXOP granting is performed may be determined, and a probability of granting TXOP to a plurality of STAs or a method of allocating a frequency or time resource block may be as the schedule information for TXOP granting.

Furthermore, the schedule fixing unit 33 for TXOP granting may acquire wireless environment information on the vicinity of the AP 10, and may limit the number of STAs that grants the TXOP or the frequency with which the TXOP is granted, depending on the number of or communication states of unmanaged APs and unmanaged STAs in the vicinity of the AP 10.

(Downlink TXOP Granting)

Downlink TXOP granting will be described in detail.

If the AP itself acquires the TXOP in the downlink, a probability that a signal of the neighboring BSS will be always detected and thus the TXOP will be able to be acquired is considerably low, a collision with a signal that is transmitted from a node which is a hidden terminal from the standpoint of the AP in the STA on the reception side is experienced and thus the communication is not successful, and so forth. Thus, the scheduling unit 30 for TXOP granting selects a STA that has communication quality of the downlink that results from the acquisition of the TXOP, which causes user experience to decrease, and sets the selected STA to be a "TXOP holder" which grants the TXOP to the AP 10.

In an example in (b) of FIG. 1, when the AP 10 is set to acquire the TXOP on the downlink, a probability that the TXOP will be acquired by the communication over the BSS a decreases. Furthermore, although the AP 10 acquires the TXOP and performs the transmission to the STA 20-1, because the communication over the BSS b that is in a hidden-terminal relation cannot be detected, a packet collision in the STA 20-1 occurs and thus a probability that the communication will fail increases. The STA 20-1 as in such a case is selected and the TXOP that is acquired by the STA is granted to the AP 10, and thus the user experience on the downlink can be improved.

Figure 7:
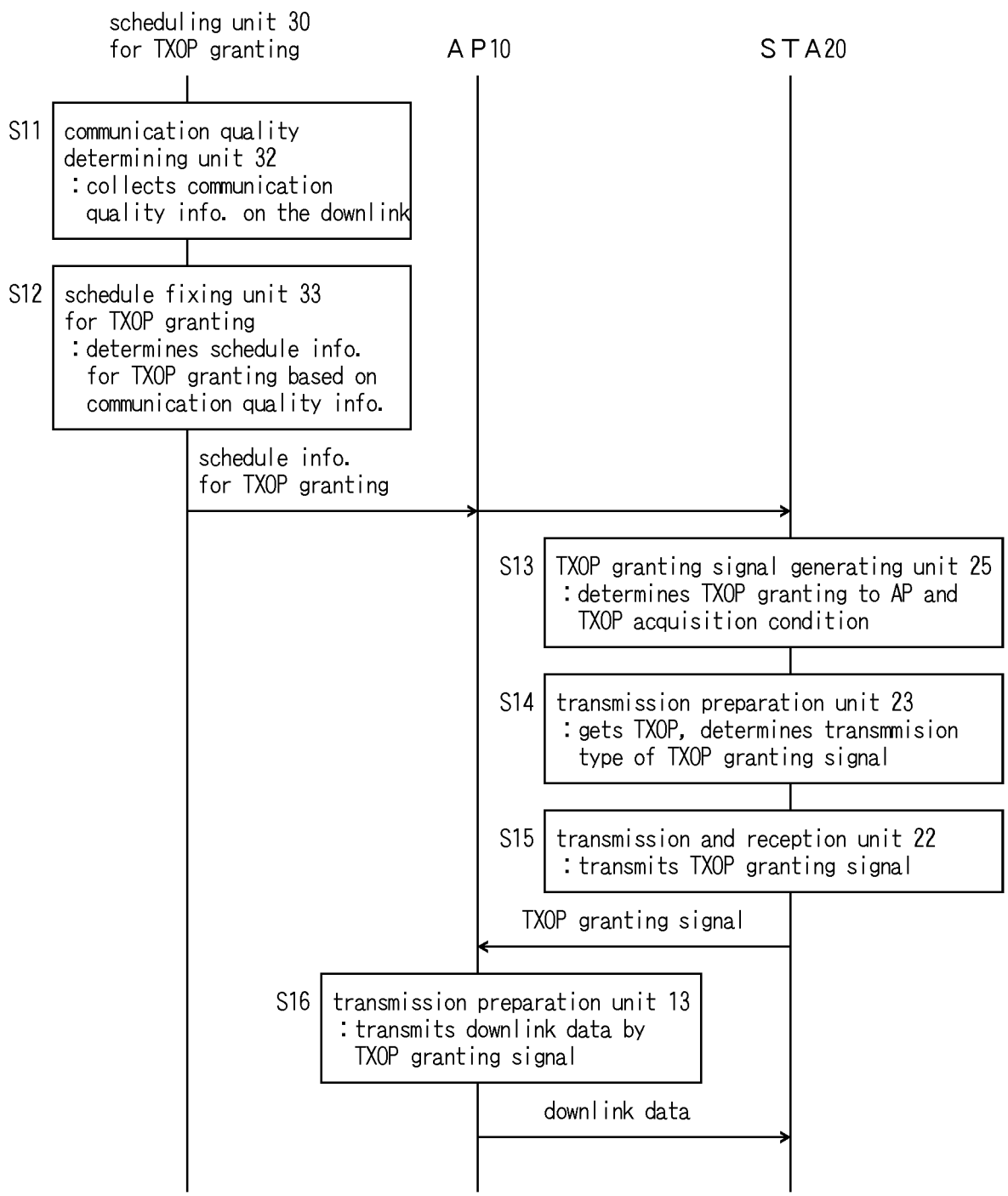
FIG. 7 is a diagram illustrating an example of a processing procedure for downlink data transmission that results from a STA granting the TXOP.

FIG. 7 illustrates an example of a processing procedure for the downlink data transmission that results from the STA granting the TXOP.

In FIG. 7, the communication quality determining unit 32 of the scheduling unit 30 for TXOP granting collects communication quality information on the downlink or the uplink/downlink (Step S11). Next, based on the collected communication quality information, the schedule fixing unit 33 for TXOP granting determines the schedule information for TXOP granting that is made up of information on one or more STAs to which the AP 10 grants the TXOP or information which includes TXOR acquisition conditions of the one or more STAs, and notifies the corresponding STA 20 of the determined schedule information through the AP 10 (Step S12). When the schedule information for TXOP granting is input, the TXOP granting signal generating unit 25 of the STA 20 outputs the information that the TXOP is granted to the AP 10 and the TXOR acquisition condition to the transmission preparation unit 23 (Step S13). The transmission preparation unit 23 determines a transmission type of the TXOP granting signal in accordance with the presence or absence of the uplink data, and notifies the transmission and reception unit 22 of the determined transmission type (Step S14). If uplink data is present, the transmission and reception unit 22 transmits the TXOR granting signal after transmitting the uplink data. If the uplink data is not present, the transmission and reception unit 12 transmits the TXOR granting signal after acquiring the TXOP (Step S15). The STA 10 that receives the TXOR granting signal transmits the downlink data at a timing that is set by the TXOR granting signal (Step S16).

At this point, in the AP, if it is determined that throughput of the downlink data transmission that results from the acquisition of the TXOP causes the user experience to decrease, or that the communication quality that results from the acquisition of the TXOP for the uplink data transmission is high, three methods of selecting the STA that grants the TXOP to the AP will be described.

(Method 1 of Selecting the TXOP Holder)

The scheduling unit 30 for TXOP granting collects information relating to transmission-awaiting user data for the STA that is an AP 10's partner in the downlink data transmission, the request traffic information, and the application information. Then, in each STA, the throughput of the downlink data transmission that results from the acquisition of the TXOP from the AP is compared against the condition, and the TXOP holder is preferentially selected from among STAs in which the throughput of the downlink data transmission is in the poorest condition. The transmission resource that is allocated by the OFDMA or the spatial multiplexing may be determined from the PHY rate between the AP 10 and the STA and bits of a transmission packet, and the downlink data transmission from a plurality of STA's may be performed.

(Method 2 of Selecting the TXOP Holder)

The AP 10 measures the frame error rate of the downlink that results from the AP acquiring the TXOP, and based on a result of the measurement, the scheduling unit 30 for TXOP granting preferentially selects the STA that has a high frame error rate, as the TXOP holder.

(Method 3 of Selecting the TXOP Holder)

The scheduling unit 30 for TXOP granting evaluates the communication quality (the throughput or the frame error rate) of the uplink and the downlink that results from the acquisition of the TXOP. As the communication quality of the downlink that results from the acquisition of the TXOP is poorer by comparison with the communication quality of the uplink that results from the acquisition of the TXOP, the scheduling unit 30 for TXOP granting more preferentially makes a selection as the TXOP holder.

With the methods of selecting the TXOP holder, which are described above, based on the statistical information or the empirical assumption, the TXOP can be preferentially granted to the STA that has the low quality of the downlink data transmission, and the user experience can be prevented from decreasing because of the low quality of the downlink data transmission.

Furthermore, based on the method of selecting the TXOP holder, which are described above, the frequency with which the STA grants the TXOP, the condition that the STA grants the TXOP, or the throughput when the STA grants the TXOP can be designated by the schedule information for TXOP granting. For example, a contention window size of back-off may be designated for the acquisition of the TXOP for the TXOP granting, a timing at which the TXOP is started or a timing at which the TXOP is ended may be designated, or the granting of the TXOP may be controlled in such a manner that constant throughput is satisfied, using communication quality information on other external communication units, positional information on the STA, information on the function of the STA, information on the remaining amount of battery in the STA, or the like, as a condition for performing the TXOP granting.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. A wireless communication system in which, based on a random access scheme, a transmission opportunity (TXOP) acquired by a wireless access point is granted to a wireless station when performing uplink data transmission from the wireless station to the wireless access point, the system comprising a scheduling unit included in the wireless access point for TXOP granting monitoring a quality of the uplink data transmission, collecting information relating to transmission-awaiting user data from the wireless station that is the wireless access point partner in the uplink communication, determining, based on the collected information, one or more wireless stations having a parameter, which indicates the quality of the uplink data transmission, lower than a prescribed value as TXOP responders to which the wireless access point grants the TXOP, and transmitting a notification signal representing information on the determination to the wireless access point, wherein:

the wireless access point includes a unit that, in response to receiving the notification signal, acquires the TXOP using a random access scheme and transmits a TXOP granting signal indicating a timing to perform the uplink data transmission to the TXOP responders, wherein the unit determines presence or absence of downlink data for the TXOP responders and, in the presence of the downlink data, transmits the TXOP granting signal after transmitting the downlink data and, in the absence of the downlink data, transmits the TXOP granting signal after acquiring the TXOP; and the wireless station includes a transmission and reception unit transmitting a data frame on the uplink at the indicated timing set by the TXOP granting signal.

2. The wireless communication system according to claim 1, wherein the scheduling unit for TXOP granting is configured to use, as the parameter indicating the quality of the uplink data transmission, at least one of a value indicating degradation in the quality of the uplink data transmission in contrast to the quality of the downlink data transmission, a frame error rate of the uplink, a TXOP acquisition rate of the uplink, a ratio of throughput to one of a quality of service (QoS) condition and a traffic volume demand in the uplink, and a frame retransmission rate of the uplink.

3. The wireless communication system according to claim 1, wherein the scheduling unit for TXOP granting is configured to collect uplink traffic information relating to one of a traffic volume and a transmission-awaiting packet generated by the wireless station, and to determine as the TXOP responders when the quality of the uplink data transmission is lower than the prescribed value and a demand for uplink traffic in the wireless station is higher than the prescribed value.

4. A wireless communication system in which, based on a random access scheme, a transmission opportunity (TXOP) acquired by a wireless station is granted to a wireless access point when performing downlink data transmission from the wireless access point to the wireless station, the system comprising a scheduling unit included in the wireless access point for TXOP granting monitoring a quality of the downlink data transmission, collecting information relating to transmission-awaiting user data from the wireless access point that is the wireless station partner in the downlink communication, determining, based on the collected information, wireless access point having a parameter, which indicates the quality of the downlink data transmission, lower than the prescribed value as TXOP holders which grant the TXOP to the wireless access point, and transmitting a notification signal representing information on the determination to the wireless station, wherein:
the wireless station includes a unit that, in response to receiving the notification signal, acquires the TXOP using a random access scheme and transmits a TXOP granting signal indicating a timing to perform the downlink data transmission to the wireless access point, wherein the unit determines presence or absence of downlink data for the TXOP responders and, in the presence of the downlink data, transmits the TXOP granting signal after transmitting the downlink data and, in the absence of the downlink data, transmits the TXOP granting signal after acquiring the TXOP; and
the wireless access point includes a transmission and reception unit transmitting a data frame on the downlink at the indicated timing set by the TXOP granting signal.

5. The wireless communication system according to claim 4, wherein
the scheduling unit for TXOP granting is configured to use, as the parameter indicating the quality of the downlink data transmission, at least one of a value indicating degradation in the quality of the downlink data transmission in contrast to the quality of the uplink data transmission, a frame error rate of the downlink, a ratio of throughput to one of a quality of service (QoS) condition and a traffic volume demand in the downlink, and a frame retransmission rate of the downlink.

6. The wireless communication system according to claim 4, wherein
the scheduling unit for TXOP granting is configured to collect downlink traffic information relating to one of a traffic volume and a transmission-awaiting packet from the wireless access point to the wireless station, and to determine as the TXOP responders when the quality of the downlink data transmission is lower than the prescribed value and a demand for downlink traffic in the wireless access point is higher than the prescribed value.

7. A wireless communication method in which, based on a random access scheme, a TXOP acquired by a wireless access point is granted to a wireless station when performing uplink data transmission from the wireless station to the wireless access point, the method comprising:
a step causing a scheduling unit included in the wireless access point for TXOP granting, which monitors a quality of the uplink data transmission, which collects information relating to transmission-awaiting user data from the wireless station that is the wireless access point partner in the uplink communication, to determine, based on the collected information, one or more wireless stations having a parameter lower than a prescribed value as TXOP responders to which the wireless access point grants the TXOP, and to transmit a notification signal representing information on the determination to the wireless access point, the parameter indicates the quality of the uplink data transmission;
a step causing the wireless access point to, in response to receiving the notification signal, acquire the TXOP using a random access scheme and transmit a TXOP granting signal indicating a timing to perform the uplink data transmission to the TXOP responders;
a step causing the wireless access point to determine presence or absence of downlink data for the TXOP responders and, in the presence of the downlink data, causing to transmit the TXOP granting signal after transmitting the downlink data and, in the absence of the downlink data, causing to transmit the TXOP granting signal after acquiring the TXOP; and
a step causing the wireless station to transmit a data frame on the uplink at the indicated timing set by the TXOP granting signal.

8. A wireless communication method in which, based on a random access scheme, a TXOP acquired by a wireless station is granted to a wireless access point when performing downlink data transmission from the wireless access point to the wireless station, the method comprising:
a step causing a scheduling unit included in the wireless access point for TXOP granting, which monitors a quality of the downlink data transmission which collects information relating to transmission-awaiting user data from the wireless access point that is the wireless station partner in the downlink communication, to determine, based on the collected information, wireless access point having a parameter lower than a prescribed value as TXOP holders which grant the TXOP to the wireless access point, and to transmit a notification signal representing information on the determination to the wireless station, the parameter indicates the quality of the downlink data transmission;
a step causing the wireless station to, in response to receiving the notification signal, acquire the TXOP using a random access scheme and transmit a TXOP granting signal indicating a timing to perform the downlink data transmission to the wireless access point;
a step causing the wireless station to determine presence or absence of uplink data for the wireless access point and, in the presence of the uplink data, causing to transmit the TXOP granting signal after transmitting the uplink data and, in the absence of the uplink data, causing to transmit the TXOP granting signal after acquiring the TXOP; and
a step causing the wireless access point to transmit a data frame on the downlink at the indicated timing set by the TXOP granting signal.

* * * * *